Jan. 21, 1936.    J. C. CROWLEY    2,028,592
VALVE STEM
Filed July 19, 1934

INVENTOR
JOHN C. CROWLEY
Kwis, Hudson & Kent
ATTORNEYS

Patented Jan. 21, 1936

2,028,592

UNITED STATES PATENT OFFICE 2,028,592

VALVE STEM

John C. Crowley, Cleveland Heights, Ohio, assignor to The Dill Manufacturing Company, Cleveland, Ohio, a corporation of Ohio Application July 19, 1934, Serial No. 736,016

9 Claims. (Cl. 152—12)

This invention relates to a valve stem of the type used upon pneumatic tires. More particularly the invention relates to a valve stem formed of metal and having a rubber base permanently attached thereto and which base is adapted to be vulcanized to a tire tube to secure the stem in position thereon.

An object of the invention is to provide a valve stem which is so constructed that when the rubber base is attached to the head of the stem the molds which press the rubber base upon the head of the stem will not cause a flash of the rubber base to extend along the stem toward the outer end thereof.

Another object is to provide a valve stem which is so constructed that it may be readily and accurately positioned in the molds for the base attaching operation.

A further object is to provide a valve stem which is so constructed as to compensate for varying thicknesses in the stem head during the base attaching operations, whereby to accurately position the head in the base and to enable the molds to exert the desired pressure upon the base and stem.

A further object is to provide a valve stem which is so constructed that the center portion of the stem head will be positively supported to resist the action of the molds during the base attaching operation, to the end that said center portion will not be disproportionately depressed with respect to the remainder of the stem head.

Further and additional objects and advantages residing in the invention will become apparent hereinafter during a detailed description of an embodiment thereof which is to follow and which is illustrated in the accompanying drawing, wherein Fig. 1 is a sectional view through the molds which are used to attach the rubber base to the stem head, the stem being shown partly in elevation and partly in section in the position it assumes when the base is attached to the head thereof.

Figure 1:
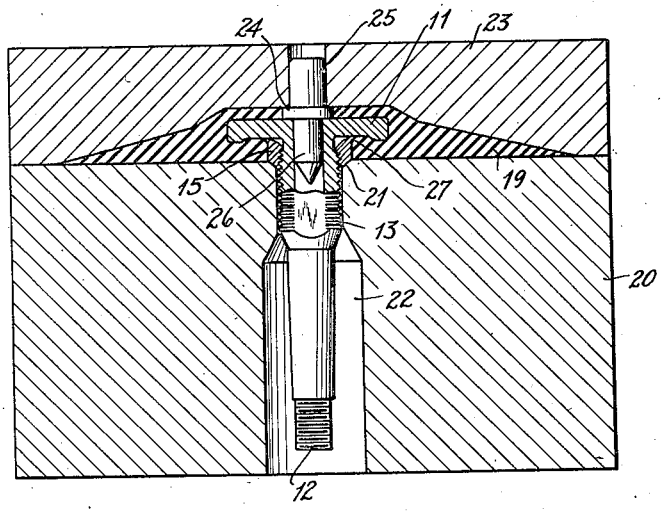
Figure 3:
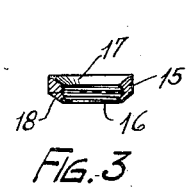
Fig. 3 is a detail sectional view of the metallic ring which is secured to the stem adjacent the head thereof.
Figure 4:
Fig. 4 is a bottom plan view of the metallic ring shown in Fig. 3.
Figures 2, 5:
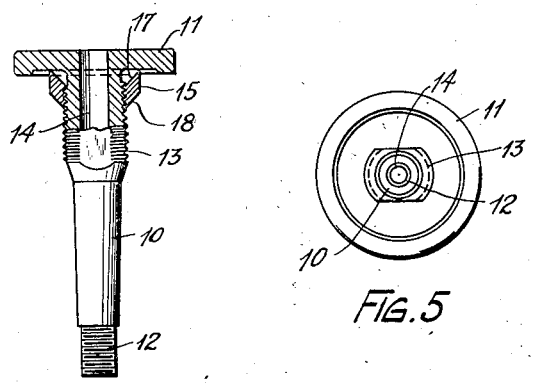
Fig. 2 is a detail of the valve stem partly in elevation and partly in section and illustrates the condition of the stem prior to being placed in the molds and having the rubber base attached to the head thereof.
Fig. 5 is a plan view of the valve stem, looking from the bottom of Fig. 2 with the metal ring removed.

The valve stem illustrated in Figs. 1, 2 and 5 is substantially conventional and comprises a stem portion proper 10 at one end of which is a stem head 11. The stem 10 at its outer end is provided with a reduced externally threaded portion 12 to receive a valve cap or pump coupling and adjacent the head 11 with an enlarged externally threaded portion 13 which receives a rim nut or dust cap, as is well understood. As usual the valve stem is provided with a bore 14 extending therethrough and having adjacent the outer end of the stem a tapered portion to receive a valve insides as is well understood.

It is often desirable to attach the head of the stem to a rubber base, which in turn is secured to the tire tube in preference to clamping the tire tube between the head of the stem and a nut secured down upon the portion 13 thereof. In attaching the rubber base to the head of the stem, the stem and base are positioned in suitable molds, which, when brought together, press the base upon the stem for vulcanizing the same thereto.

It has been found that in attaching the base to the stem in this manner it is difficult to maintain the stem in the proper position in the molds and in the base for the reason that the thickness of the stem heads varies in different size stems, with the result that the head would not be properly positioned in the base, when the latter is attached thereto, since there would be no positive resistance to the action of the movable mold, but only the resistance afforded by the rubber base, until the stem head itself was brought closely adjacent to the fixed mold. Of course, this difficulty could be overcome to some extent by providing molds of different sizes for different size stems, but naturally such provision would increase the cost of manufacture. A further difficulty arises in attaching the rubber base to the stem head in that the action of the molds causes a flash of rubber to be formed along the externally threaded portion 13 of the stem which should be avoided.

The present invention contemplates the provision of means upon the stem adjacent the head thereof which will compensate for variations in the thickness of the stem heads, will accurately position the stem in the fixed mold member, and will exert a positive resistance to the movable mold member, as well as prevent the formation of a rubber flash along the threaded portion 13. The present invention further contemplates the provision of such means which does not have to be made an integral part of the stem and thereby increase the cost of manufacture of the stem, but which enables the stem to be produced as heretofore and can then be attached to the stem and permanently united thereto during the base attaching operation.

In providing the means above referred to, it is proposed to employ a metallic ring 15 having a threaded bore 16 therethrough and terminating adjacent one end of the metallic ring in a conical counterbore or recess 17. The ring 15 at the end opposite to the conical counterbore or recess 17 is provided with a conical tapered end 18 substantially parallel to the sides of the recess 17. The bore 16 through the ring 15 is of such size that the threads thereof will have a loose fit upon the threads of the portion 13 of the valve stem.

The ring 15 is positioned upon the valve stem and screwed downwardly until the outer edge of the conical recess or counterbore 17 contacts the head 11 of the stem, as clearly shown in Fig. 2. It will be seen that, when the valve stem and the rubber base 19 are positioned in the fixed mold member 20, preparatory to attaching the base 19 to the stem head, the conical end 18 of the ring will seat in the conical counterbore 21 formed at the end of the bore 22 through the mold member 20, which receives the valve stem, and thus accurately positions the stem in the mold 20. When the movable mold member 23 engages the base 19 to press the base upon the head of the stem, the flange 24 of a pin 25, carried by the mold member 23, will engage the head 11 of the stem adjacent the center portion thereof, while a pilot portion 26 on the pin passes into the bore 14 in the valve stem.

The action of the movable mold member 23 is positively resisted by the metallic ring 15 with the result that the loose fit between the threads of the ring and the threads of the portion 13 of the stem causes the interengaging threads to be deformed and interlocked, while the edge of the conical recess 17 of the ring is deflected outwardly into tight engagement with the base, as indicated at 27 in Fig. 1. The ring is thus permanently secured to the valve stem and in effect becomes an integral part thereof.

It will be noted that the ring acts, as previously stated, to position the valve stem in the fixed mold member 20 and to hold the same in such position so as to exert a positive resistance to the action of the movable mold member 23, wherefore, the rubber base 19 is properly and definitely positioned and attached to the head 11 of the stem. It will also be noted that the metal ring 15 prevents the flange 24 of the pin 25 from depressing the central portion of the head 11 of the stem to such an extent that the head is deformed or substantially distorted, inasmuch as action of the flange 24 is being positively resisted by the metallic ring. In addition the metallic ring 15 prevents the rubber of the base 19 from being forced into the conical counterbore 21 of the bore 22 through the fixed mold member and forming a rubber flash along the portion 13 of the valve stem which would be the case were the ring not present.

Although a preferred embodiment of the invention has been illustrated and described herein, it should be understood that the invention is susceptible of various modifications and adaptations within the scope of the appended claims.

Having thus described my invention, I claim:

1. A valve stem comprising an integral head portion and stem portion and a separate member arranged on the stem portion and contacting the head portion, said member and said stem portion being provided with interengaging deformed and interlocked threads.

2. A valve stem comprising an integral head portion and stem portion, said stem portion adjacent the head portion being provided with external threads, and a separate metallic member fitting upon said stem portion and having threads interengaging the threads thereof and deformed to interlock therewith, said member also having an outwardly deformed edge contacting with the head portion.

3. A valve stem comprising an integral head and a stem portion externally threaded adjacent said head, and a separate metallic member arranged on said stem portion and having a threaded bore therethrough terminating in a conical recess, the threads of the bore in said member and the threads of said stem portion being deformed and interlocked and the outer edge of the conical recess of said member being deformed outwardly and engaging said head.

4. A valve stem comprising in combination a head and a stem portion, a separate member arranged on said stem portion and permanently interlocked therewith and engaging said head, and a rubber base secured to said head and encircling said member.

5. A valve stem comprising a head portion, a stem portion, a separate member arranged on the stem portion and contacting said head portion, said member and said stem portion being provided with interengaging deformed and interlocked threads, and a rubber base secured to said head and encircling said member.

6. A valve stem comprising a head portion and a stem portion, said stem portion being provided with external threads, and a separate member encircling said stem portion and having threads interengaging the threads thereof and deformed to interlock therewith, said member also having an outwardly deformed edge contacting with the head portion.

7. A valve stem comprising a head portion, a stem portion provided with external threads, a separate member encircling said stem portion and having threads interengaging the threads thereof and deformed to interlock therewith, said member also having an outwardly deformed edge contacting with the head portion, and a rubber base secured to said head portion and encircling said member.

8. A valve stem comprising a head portion and an externally threaded stem portion, and a separate member arranged on said stem portion and having a threaded bore therethrough terminating in a substantially conical recess, the threads of the bore in said member and the threads of said stem portion being deformed and interlocked and the outer edge of the conical recess of said member being deformed outwardly and engaging said head.

9. A valve stem comprising a head portion, an externally threaded stem portion, a separate member arranged on said stem portion and having a threaded bore therethrough terminating in a conical recess, the threads of the bore in said member and the threads of said stem portion being deformed and interlocked and the outer edge of the conical recess of said member being deformed outwardly and engaging said head, and a rubber base secured to said head and encircling said member.

JOHN C. CROWLEY.